| (12) | United States Patent | (10) Patent No.: | US 8,764,293 B2 |
|---|---|---|---|
| | Nakagawa | (45) Date of Patent: | Jul. 1, 2014 |

(54) LINEAR GUIDE APPARATUS

(75) Inventor: Takumi Nakagawa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/817,276

(22) PCT Filed: Jul. 25, 2011

(86) PCT No.: PCT/JP2011/004186
§ 371 (c)(1),
(2), (4) Date: Feb. 15, 2013

(87) PCT Pub. No.: WO2012/023239
PCT Pub. Date: Feb. 23, 2012

(65) Prior Publication Data
US 2013/0142458 A1 Jun. 6, 2013

(30) Foreign Application Priority Data

Aug. 19, 2010 (JP) ................................ 2010-183968

(51) Int. Cl.
*F16C 33/00* (2006.01)

(52) U.S. Cl.
USPC .............................................. 384/15; 384/16

(58) Field of Classification Search
USPC .............. 384/15, 10, 16–20, 22, 45; 277/551, 277/585
See application file for complete search history.

(56) References Cited

U.S. PATENT DOCUMENTS

| 7,997,800 | B2 * | 8/2011 | Kakei ............................. 384/15 |
|---|---|---|---|
| 2002/0134622 | A1 | 9/2002 | Michioka et al. | |
| 2009/0052815 | A1 | 2/2009 | Kakei | |
| 2009/0148083 | A1 * | 6/2009 | Michioka et al. ................ 384/15 |
| 2012/0073396 | A1 * | 3/2012 | Kawaguchi et al. ....... 74/424.82 |

FOREIGN PATENT DOCUMENTS

| CN | 1260451 A | 7/2000 |
|---|---|---|
| JP | 6-51549 U | 7/1994 |
| JP | 8-326748 A | 12/1996 |
| JP | 10-96420 A | 4/1998 |
| JP | 2004-316762 A | 11/2004 |

OTHER PUBLICATIONS

Japanese-language Written Opinion (PCT/ISA/237) dated Oct. 11, 2011(three (3) pages).
International Search Report dated Oct. 11, 2011 w/English translation (two (2) pages).
International Preliminary Report on Patentability (PCT/IB/338 & PCT/IB/373) dated Mar. 28, 2013 (two (2) pages).
English translation (Written Opinion (PCT/ISA/237)) previously filed on Feb. 15, 2013 (four (4) pages).
Chinese Office Action with English Translation date Jun. 5, 2013 (twelve (12) pages).
Chinese Office Action dated Jan. 13, 2014 w/ English translation (9) pages).

* cited by examiner

*Primary Examiner* — Richard W Ridley
*Assistant Examiner* — Yamilka Pinero Medina
(74) *Attorney, Agent, or Firm* — Crowell & Moring LLP

(57) ABSTRACT

A linear guide apparatus includes a set of two side seals disposed at each of both ends in the direction in which a slider moves. An inner seal disposed at the slider side and an outer seal are individually attached to the slider by bolts and, respectively. Accordingly, the two side seals can be attached easily and highly precisely to the slider.

4 Claims, 21 Drawing Sheets

LINEAR GUIDE APPARATUS

TECHNICAL FIELD

The present invention relates to a linear guide apparatus which has a plurality of side seals attached to, in an overlapped manner, both ends in the direction in which a slider moves.

BACKGROUND ART

A linear guide apparatus is an apparatus which includes a guide rail, a slider, and multiple number of rolling elements, the guide rail and slider have rolling surfaces, respectively, which are disposed so as to face with each other to form a rolling channel for the rolling elements, and the rolling elements roll over such a rolling channel so that either one of the guide rail or the slider takes a linear motion with respect to the other.

According to conventional linear guide apparatuses, side seals each having a rubber lip which contacts the guide rail in a sliding manner are disposed at both ends in the direction in which the slider moves. This prevents foreign materials from entering into the interior from both ends of the direction in which the slider moves linearly.

Conventionally, there is proposed to employ an integral double-lip structure to the lip of the side seal, thereby improving both dust proofing performance and sliding performance (see, for example, Patent Document 1). Patent Document 1 also discloses that the double-lip structure is formed by an external lip directed to the exterior and an internal lip directed to the interior. The external lip accomplishes the sealing performance (the dust-proof performance) against the dusts, etc., outside the slider and the internal lip accomplishes the sealing performance (hermetical sealing performance) against greases, etc., inside the slider.

However, the integral double-lip structure has a difficulty to surely attach both lips to the guide rail in a tight-contact manner. Even if the integral double-lip structure can be surely attached, a tip of another lip is pushed and lifted by the one lip when the slider moves, and foreign materials may be trapped in a space formed between the lifted tip and the guide rail.

Moreover, when the linear guide apparatus is used in especially dusty environments, side seals are doubly attached in an overlapped manner to improve the hermetical sealing performance and the repelling performance of sticking foreign materials (see, for example, Patent Document 2, paragraph) Patent Document 2 also discloses that an interspace member is disposed between the two side seals, and those side seals and the interspace member are fixed together to the end face of the slider by an attaching bolt. However, it is difficult to simultaneously attach the two side seals highly precisely.

PRIOR ART DOCUMENTS

Patent Documents

Patent Document 1: JP Hei6-51549 A
Patent Document 2: JP Hei10-96420 A

SUMMARY OF THE INVENTION

Problem to be Solved

It is an object of the present invention to provide a linear guide apparatus which enables easy-attachment of a plurality of side seals highly precisely to both ends in the direction in which a slider moves, and which accomplishes both dust-proof performance and hermetical sealing performance well.

Solution to the Problem

To achieve the above object, a first aspect of this present invention provides a linear guide apparatus that includes a guide rail, a slider, and a plurality of rolling elements, the guide rail and the slider are disposed so as to face with each other and include therebetween a rolling surface which forms a rolling channel for the rolling elements, the rolling elements are configured to roll over the rolling channel to allow either one of the guide rail and the slider to take a linear motion with respect to each other, a plurality of side seals each include a lip which contacts the guide rail in a sliding manner are disposed at each of both ends in a direction in which the slider moves, and each side seal is individually attached to the slider by a screw.

According to the linear guide apparatus of the first aspect, the plurality of side seals are individually attached to the slider by a screw, and thus the plurality of side seals can be attached easily and highly precisely. Moreover, the one lip is not affected by another lip unlike an integral double-lip structure when the slider is actuated, and thus a space is not likely to be formed between respective lips of the side seals and the guide rail.

Moreover, when an outer seal which is disposed at the outermost side of the direction in which the slider moves among the plurality of side seals includes an outward lip, and an inner seal which is disposed at the innermost side of the direction in which the slider moves includes an inward lip, both dust-proof performance and hermetical sealing performance can be accomplished by the plurality of side seals. Accordingly, the linear guide apparatus of the first aspect has both superior dust-proof performance and hermetical sealing performance in comparison with the linear guide apparatus which has the side seal with the integral double-lip structure.

As an example structure of the linear guide apparatus of the first aspect, the side seals each include a metal plate, and a tabular member and a lip both formed of an elastic material, the metal plate, the tabular member, and the lip are integral with each other, and the two side seals are disposed at each of both ends in the direction in which the slider moves, and a first through-hole that allows an axis of a first screw to pass through for attaching the inner seal to the slider, and a second through-hole that allows an axis of a second screw to pass through for attaching the outer seal to the slider are formed in the metal plate of the inner seal and the tabular member thereof.

In this case, first, the inner seals are disposed at both ends in the direction in which the slider moves, the axis of the first screw is caused to pass through the first through-hole of the inner seal, a male screw at the tip of the first screw is engaged with the female screw of the slider, and thus the inner seals are attached to both ends in the direction in which the slider moves. Next, the outer seals are disposed outwardly of respective inner seals, the axis of the second screw is caused to pass through the second through-hole of the inner seal, the male screw at the tip of the second screw is engaged with the female screw of the slider, and thus the outer seals are attached to both ends in the direction in which the slider moves via the inner seals. Accordingly, the two side seals are individually attached to the slider by the screws, respectively.

In this case, also, the linear guide apparatus of the first aspect may employ a structure in which the outer seal includes a third through-hole that allows a head of the first screw to be revealed, and a forth through-hole that is communicated with the second through-hole of the inner seal, and a spacer is disposed in the second through-hole of the metal plate of the inner seal and the tabular member thereof, an end face of the spacer contacts an end face of the slider, an another end face of the spacer contacts a periphery of the forth through-hole of the metal plate of the outer seal, and the axis of the second screw is fitted in the spacer with play.

According to this structure, the head of the first screw is operable through the third through-hole of the outer seal. Moreover, the end face of the spacer contacts the end face of the slider, the another end face of the spacer contacts the periphery of the forth through-hole of the metal plate of the outer seal, and the axis of the second screw is fitted in the spacer with a play. Accordingly, no tightening force by the second screw affects the inner seal. Therefore, the attaching position of the inner seal can be adjusted without changing the attachment condition of the outer seal after the outer seal is attached by the second screw.

Furthermore, when a metal spacer is disposed in at least either one of the first through-hole and the second through-hole of the tabular member of the inner seal, the tabular member is not distorted by the fastening of the corresponding screw. Hence, appropriate attachment of the inner or outer seal by the first or second screw is enabled.

Advantageous Effects of the Invention

According to the linear guide apparatus of the present invention, the plurality of side seals can be easily and highly precisely attached to both ends in the direction in which the slider moves and which has both dust-proof performance and hermetical sealing performance well.

DESCRIPTION OF EMBODIMENTS

Embodiments of the present invention will now be described.

[First Embodiment]

Figure 1:
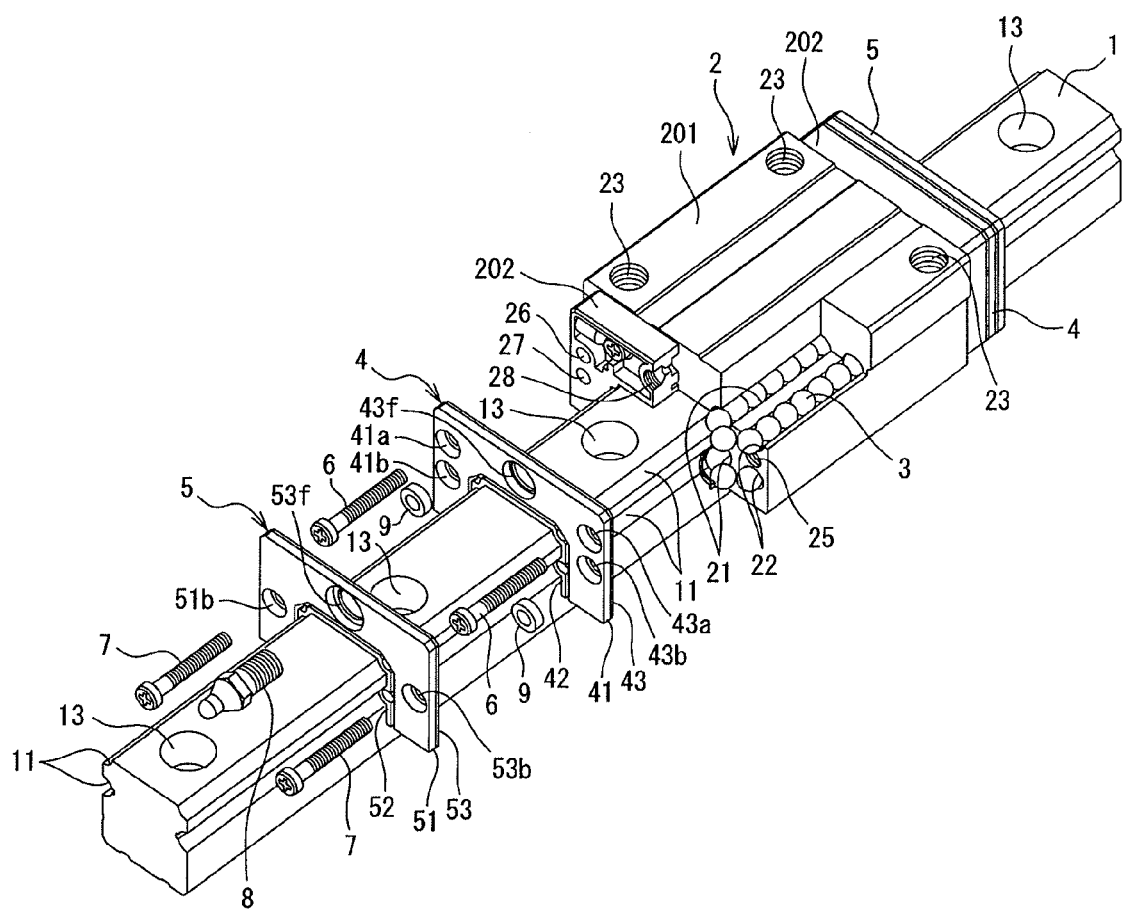
FIG. 1 is a perspective view showing a linear guide apparatus according to a first embodiment.

A linear guide apparatus of this embodiment includes, as shown in FIG. 1, a guide rail 1, a slider 2, and multiple number of balls (rolling elements) 3. The guide rail 1 and the slider 2 are disposed so as to face with each other and have therebetween rolling grooves 11 and 21, respectively, that form a rolling channel for the rolling elements 3. The slider 2 can be divided into a slider main body 201 and end caps 202 attached to both ends of the slider main body in a linear motion direction (the lengthwise direction of the guide rail 1). The rolling grooves 21 are formed in the slider main body 201.

The slider 2 also has return channels 22 for the rolling elements 3 and turn-over channels which cause each return channel 22 and each rolling channel to be communicated with each other. The return channels 22 are formed in the slider main body 201 and the turn-over channels are formed in each end cap 202. Female screws 23 which allow attachment of a table, etc., by means of screws are formed in the top face of the slider 2. Attachment holes 13 for attaching the guide rail 1 to a mounting object like a base by means of bolts are formed in the guide rail 1.

According to this linear guide apparatus, the balls 3 circulate in a circulation channel configured by the rolling channel, the return channel, and the turn-over channel, thereby allowing either one of the guide rail 1 and the slider 2 to take a linear motion with respect to each other.

A set of two side seals 4 and 5 are disposed at each end in the direction in which the slider 2 moves, and the inner seal 4 disposed at the slider side and the outer seal 5 are individually attached by bolts (first screws) 6 and bolts (second screws) 7, respectively.

A female screw 25 for each bolt 7 is formed between the upper and lower return channels 22 of the slider main body 201. A female screw 24 for each bolt 6 is formed above the upper return channel 22 of the slider main body 201. Through-holes 26 for respective bolts 6, through-holes 27 for respective bolts 7, and a female screw 28 for a grease nipple 8 are formed in each end cap 202.

Figure 2:
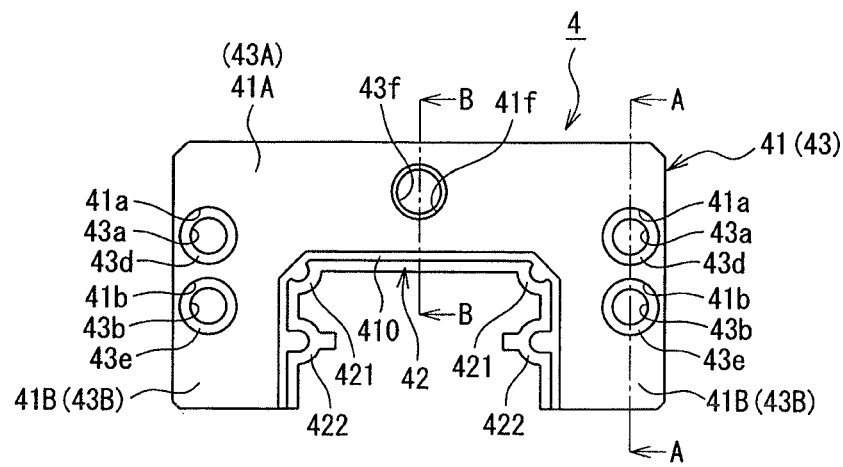
FIG. 2 is a front view showing an inner seal configuring the linear guide apparatus of the first embodiment.

The inner seal 4 will now be explained with reference to FIGS. 2 to 4. FIG. 2 is a front view showing the inner seal 4 (a diagram showing the side where the outer seal 5 is disposed), FIG. 3 is a cross-sectional view taken along a line A-A in FIG. 2, and FIG. 4 is a cross-sectional view taken along a line B-B in FIG. 2.

As shown in FIG. 2, the inner seal 4 has a substantially U-shaped front contour that is substantially same as the front contour of the end cap 202, and includes rubber-made tabular member 41 and lip 42, and, a metal plate 43. The metal plate 43 is a metal core for the inner seal 4, and the tabular member 41 and the lip 42 can be formed by bonding a molten rubber to a surface of the metal plate 43 using a mold.

The tabular member 41 and the metal plate 43 have upper portions 41A and 43A, respectively, to be disposed above the guide rail 1 and respective pairs of side portions 41B and 43B to be disposed at both sides of the guide rail 1. The lip 42 have protrusions 421 and 422 which are in a shape fittable with respective rolling grooves 11 formed in the corners of the guide rail 1 and the side faces thereof. Through-holes (first through-holes) 41a for respective bolts 6 and through-holes (second through-holes) 41b for respective bolts 7 are formed in the side portions 41B of the tabular member 41. The through-holes 41b for respective bolts 7 are disposed below respective through-holes 41a for the bolts 6.

Figure 3:
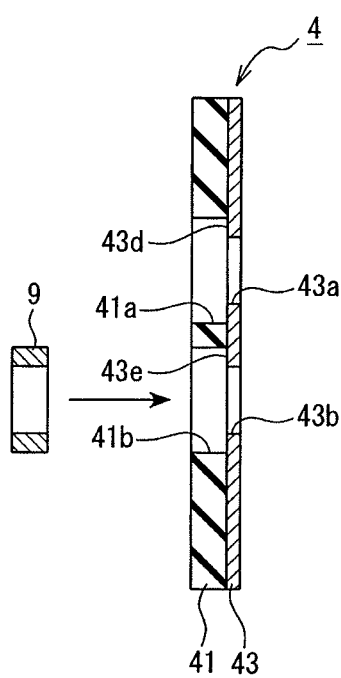
FIG. 3 is a cross-sectional view taken along a line A-A in FIG. 2.
Figure 4:
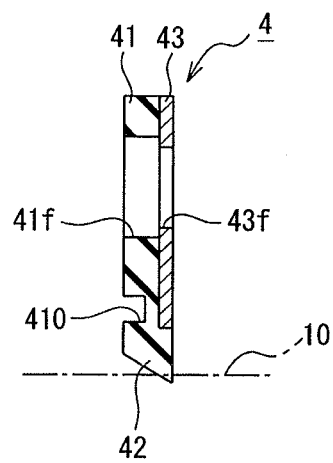
FIG. 4 is a cross-sectional view taken along a line B-B in FIG. 2.

As shown in FIG. 2 and FIG. 3, through-holes (first through-holes) 43a for respective bolts 6 and through-holes (second through-holes) 43b for respective bolts 7 are formed in the metal plate 43 at respective same positions as those of the through-holes 41a and 41b of the tabular member 41. The through-holes 43a and 43b of the metal plate 43 are openings which have a diameter that allows respective axes of the bolts 6 and 7 to pass through but does not allow respective heads of the bolts 6 and 7 to pass through. The through holes 41a and 41b of the tabular member 41 are openings which have a diameter that allows respective heads of the bolts 6 and 7 to pass through.

Accordingly, peripheries 43d and 43e of respective through-holes 43a and 43b of the metal plate 43 are revealed on the front face of the inner seal 4. The periphery 43d of the through-hole 43a between those serves as a seat for the bolt 6. Moreover, a metal spacer 9 is disposed in each through-hole 41b of the tabular member 41, and has the end face contacting the periphery 43e of the through-hole 43b. The spacer 9 has a dimension in the axial direction which is consistent with the thickness of the tabular member 41 of the inner seal 4, has an external diameter which is consistent with the internal diameter of the through-hole 41b of the tabular member 41, and has an internal diameter which is consistent with the internal diameter of the through-hole 43b of the metal plate 43.

As shown in FIG. 2 and FIG. 4, a through-hole 43f for the grease nipple 8 is formed in the center in the widthwise direction and in the upper portion 43A of the metal plate 43. This through-hole 43f has a dimension and a diameter that allow the axis of the grease nipple 8 to pass through but does not allow the head of the grease nipple to pass through. A through-hole 41f for the grease nipple 8 which has a slightly larger diameter than that of the through-hole 43f is also formed in the tabular member 41 at the same position as that of the through-hole 43f.

As shown in FIG. 4, the tabular member 41 has a thickness substantially twice as much as the thickness of the metal plate 43, and a recess 410 is formed in the boundary position with the lip 42. The lip 42 extends (toward a face 10 of the guide rail 1) so as to protrude from a substantially U-shaped opening 431 of the metal plate 43. A tip of the lip 42 is tapered downwardly from the recess-410 side toward the metal-plate-43 side. The inner seal 4 is attached with the metal plate 43 being directed to the slider 2, and thus the lip 42 of the inner seal 4 is an inward lip directed to the slider-2 side.

Figure 5:
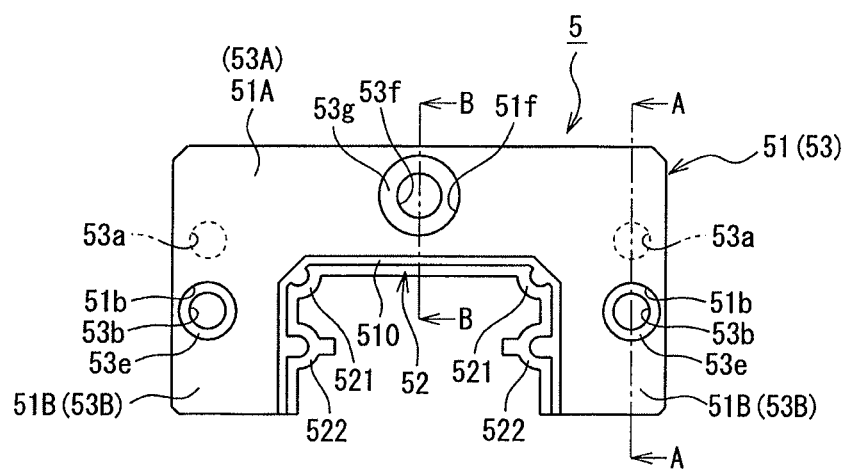
FIG. 5 is a front view showing an outer seal configuring the linear guide apparatus of the first embodiment.

The outer seal 5 will now be explained with reference to FIGS. 5 to 7. FIG. 5 is a front view showing the outer seal 5, FIG. 6 is a cross-sectional view taken along a line A-A in FIG. 5, and FIG. 7 is a cross-sectional view taken along a line B-B in FIG. 5.

As shown in FIG. 5, the outer seal 5 has a U-shaped front contour that is substantially same as the front contour of the end cap 202, and includes rubber-made tabular member 51 and lip 52, and, a metal plate 53. The metal plate 53 is a metal core for the outer seal 5, and the tabular member 51 and the lip 52 are formed by bonding a molten rubber to a surface of the metal plate 53 using a mold.

The tabular member 51 and the metal plate 53 have upper portions 51A and 53A, respectively, to be disposed above the guide rail 1, and respective pairs of side portions 51B and 53B to be disposed at both sides of the guide rail 1. The lip 52 has protrusions 521 and 522 formed in a shape fittable with respective rolling grooves 11 in the corners of the guide rail 1 and the side faces thereof. Through-holes 51b for respective bolts 7 are formed in the side portions 51B of the tabular member 51 at respective same positions as those of the through-holes 43b of the inner seal 4.

Figure 6:
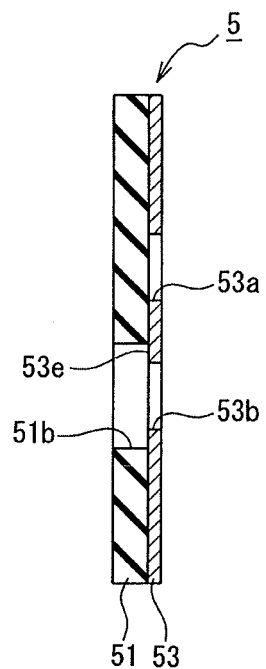
FIG. 6 is a cross-sectional view taken along a line A-A in FIG. 5.
Figure 7:
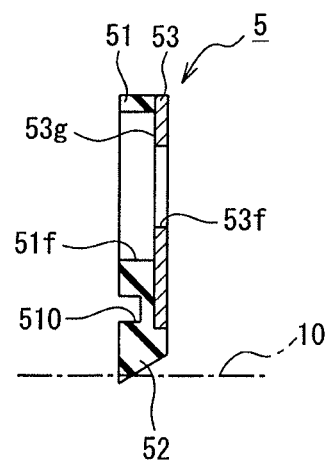
FIG. 7 is a cross-sectional view taken along a line B-B in FIG. 5.

As shown in FIG. 5 and FIG. 6, through-holes 53b for respective bolts 7 are formed in the metal plate 53 at respective same positions as those of the through-holes 51b of the tabular member 51. The through-holes 53b of the metal plate 53 are each an opening which has a diameter that allows the axes of the bolt 7 to pass through but does not allow the head of the bolt 7 to pass through. The through-holes 51b of the tabular member 51 are each an opening which has a diameter that allows the head of the bolt 7 to pass through. Accordingly, peripheries 53e of the through-holes 53b of the metal plate 53 are revealed on the front face of the outer seal 5 and serve as a seat for each bolt 7.

Through-holes 53a which have the same diameter as that of the through-hole 43a are formed in the metal plate 53 at respective same positions as those of the through-holes 43a of the metal plate 43 of the inner seal 4. These through-holes 53a are covered by the tabular member 51 and are not revealed on the front face of the outer seal 5.

As shown in FIG. 5 and FIG. 7, a through-hole 53f for the grease nipple 8 is formed in the center of the upper portion 53A of the metal plate 53 in the widthwise direction. A through-hole 51f for the grease nipple 8 is also formed in the tabular member 51 at the same position as that of the through-hole 53f. The through-hole 53f of the metal plate 53 is an opening which has a diameter that allows the axis of the grease nipple 8 to pass through but does not allow the head of the grease nipple to pass through. The through-hole 51f of the tabular member 51 is an opening which has a diameter that allows the head of the grease nipple 8 to pass through. Accordingly, the through-hole 53f of the metal plate 53 has a periphery 53g revealed on the front face of the outer seal 5 and serving as a seat for the grease nipple 8.

As shown in FIG. 7, the tabular member 51 has a thickness substantially twice as much as the thickness of the metal plate 53, and a recess 510 is formed in the boundary position with the lip 52. The lip 52 extends (toward the face 10 of the guide rail 1) so as to protrude from a substantially U-shaped opening 531 of the metal plate 53. A tip of the lip 52 is tapered upwardly from the recess-510 side toward the metal-plate-53 side. The outer seal 5 is attached with the metal plate 53 being directed to the slider 2, and thus the lip 52 of the outer seal 5 is an outward lip directed opposite to the slider 2.

Figure 8:
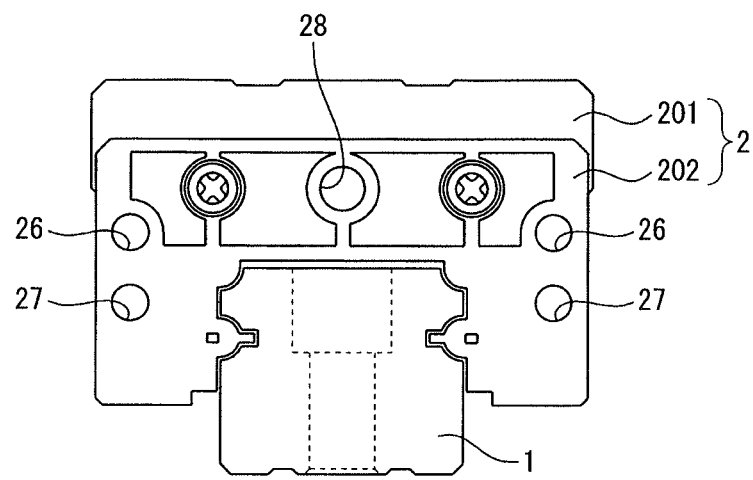
FIG. 8 is a front view showing the linear guide apparatus before the inner seal and the outer seal are attached thereto.

The inner seals 4 and the outer seals 5 are attached to both ends of the slider 2 through the following method after the guide rail 1 is assembled with the slider 2 (a slider main body 201 and the end caps 202) and the balls 3 to let the linear guide apparatus to be in the condition shown in FIG. 8 (front view).

Figure 9:
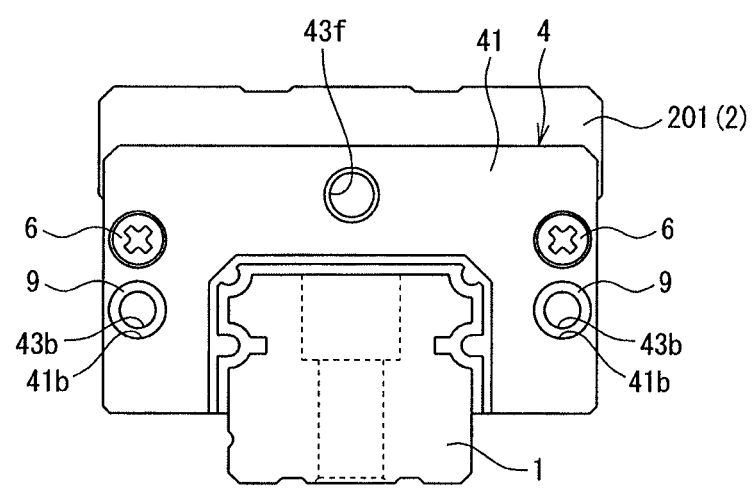
FIG. 9 is a front view showing the linear guide apparatus with the inner seal being attached thereto and a spacer being disposed according to the first embodiment.

First, the inner seals 4 are disposed outwardly of respective end caps 202 of the slider 2 with each metal plate 43 being directed to the end cap 202. Next, the axes of the bolts 6 are caused to pass through respective through-holes 41a of the tabular member 41 of the inner seal 4, respective through-holes 43a of the metal plate 43, and respective through-holes 26 of the end cap 202, and the male screws at respective tips of the bolts 6 are engaged with the female screws 24 of the slider main body 201. Next, the metal spacers 9 are fitted in respective through-holes 41b of the tabular member 41 of the inner seal 4. FIG. 9 shows this condition.

Next, the outer seals 5 are disposed outwardly of respective inner seals 4 with each metal plate 53 being directed to the inner seal 4. Subsequently, the axes of the bolts 7 are caused to pass through respective through-holes 51b of the tabular member 51 of the outer seal 5, respective through-holes 53b of the metal plate 53, respective spacers 9 disposed in respective through-holes 41b of the tabular member 41 of the inner seal 4, respective through-holes 43b of the metal plate 43 of the inner seal 4, and respective through-holes 27 of the end cap 202. The male screws at respective tips of the bolts 7 are engaged with respective female screws 25 of the slider main body 201.

Figure 10:
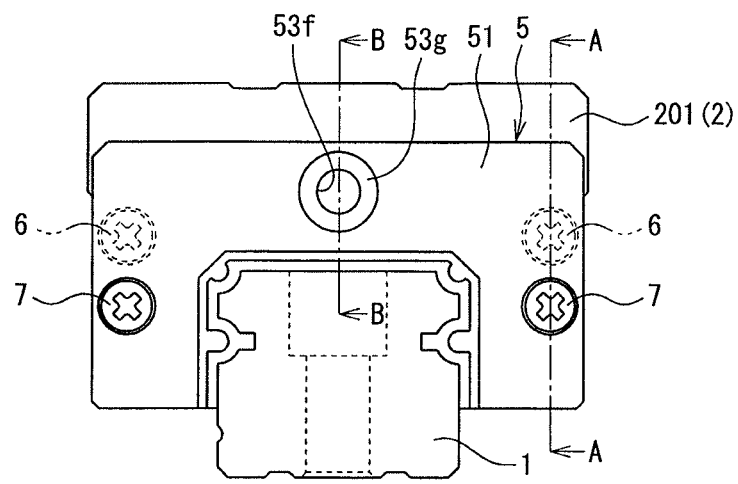
FIG. 10 is a front view showing the linear guide apparatus with the outer seal being attached thereto according to the first embodiment.
Figure 11:
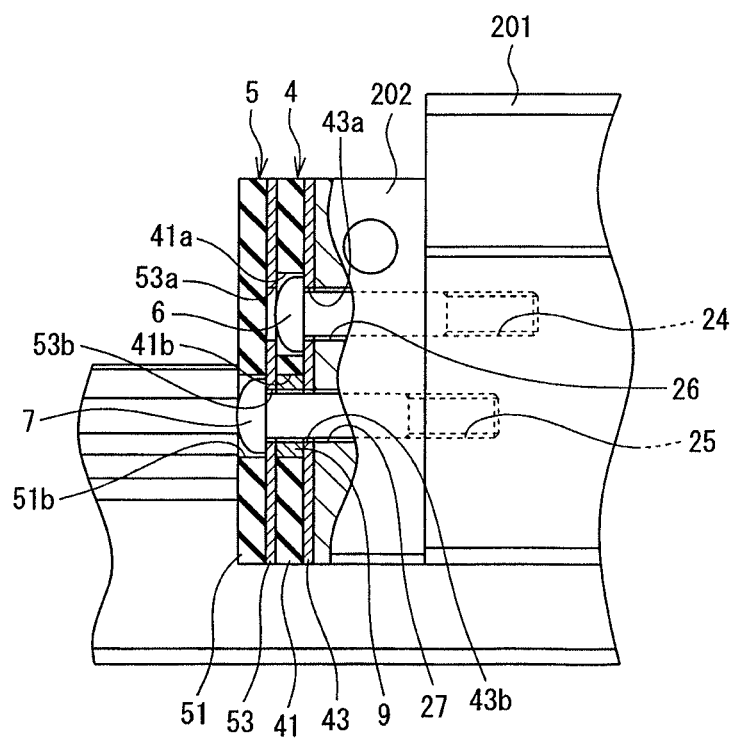
FIG. 11 is a side view showing an end of a slider of the linear guide apparatus of the first embodiment with the outer seal being attached and showing a cross section taken along a line A-A in FIG. 10 with several portions being indicated by dashed lines.
Figure 12:
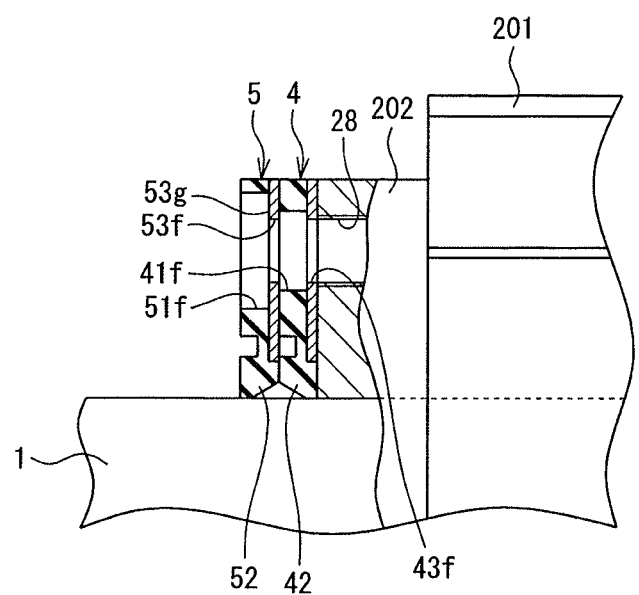
FIG. 12 is a diagram showing a cross section of the end of a slider of the linear guide apparatus taken along a line B-B in FIG. 10 according to the first embodiment with the external seal being attached.

FIG. 10 is a front view showing the linear guide apparatus in this condition. FIG. 11 is a side view showing the end of the slider of the linear guide apparatus in this condition and showing a cross section taken along a line A-A in FIG. 10 with several portions being indicated by dashed lines. FIG. 12 is a diagram showing a cross section of the end of a slider of the linear guide apparatus in this condition taken along a line B-B in FIG. 10.

With respect to the linear guide apparatus in this condition, the axis of the grease nipple 8 is caused to pass through the through-hole 53f of the outer seal 5 and the through-hole 43f of the inner seal 4. The male screw at the tip of the grease nipple 8 is engaged with the female screw 28 of the end cap 202, and the head of the grease nipple 8 is fitted in the through-hole 51f of the outer seal 5 to place the head of the grease nipple at the periphery 53g of the through-hole 53f (see FIG. 12). Accordingly, the assembling of the linear guide apparatus is completed.

According to the linear guide apparatus of this embodiment, the inner seal 4 and the outer seal 5 are individually attached to the slider main body 201 by bolts (screws) 6 and 7, and thus the two side seals disposed in an overlapped manner can be attached easily and highly precisely. Moreover, the one lip is not affected by another lip unlike the integral double-lip structure when the slider 2 is actuated, and thus a space is not likely to be formed between the adjoining lips 42 and 52 and the guide rail 1.

Moreover, as shown in FIG. 12, the outer seal 5 disposed outwardly of the direction in which the slider 2 moves has the lip 52 directed outwardly, and the inner seal 4 disposed inwardly of the direction in which the slider 2 moves has the lip 42 directed inwardly. Hence, both dust-proof performance and hermetical sealing performance can be accomplished by the two side seals 4 and 5. Accordingly, the linear guide apparatus of this embodiment has both superior dust-proof performance and hermetical sealing performance in comparison with the linear guide apparatus which has the side seal with the integral double-lip structure.

Furthermore, according to the linear guide apparatus in this condition, as shown in FIG. 11, a through-hole 53a is present in the metal plate 53 of the outer seal 5, and thus the bump of the head of the bolt 6 does not disturb attachment of the outer seal 5 by the bolts 7. Still further, the metal spacer 9 is disposed in the through-hole 41b of the rubber-made tabular member 41 of the inner seal 4, has an end face contacting the periphery 43e of the through-hole 41b, and has another end face contacting the periphery 53e of the through-hole 53b of the outer seal 5, and the axis of the bolt 7 is fitted in the spacer 9 with play. Accordingly, it becomes possible to prevent the rubber-made tabular member 41 from being elastically deformed in the thickness direction when the outer seal 5 is attached by the bolts 7.

Therefore, appropriate attachment of the outer seal 5 by the bolts 7 is enabled.

[Second Embodiment]

Figure 13:
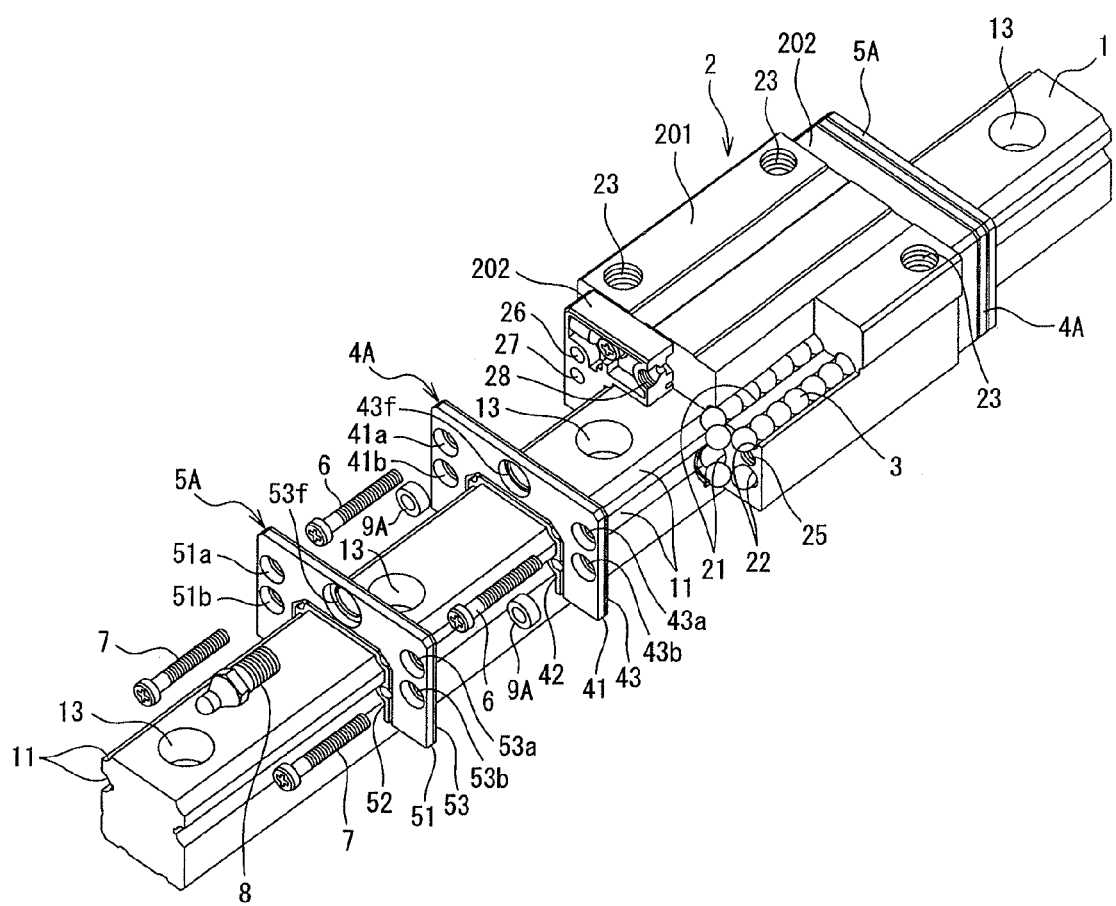
FIG. 13 is a perspective view showing a linear guide apparatus according to a second embodiment.

A linear guide apparatus of this embodiment includes, as shown in FIG. 13, a guide rail 1, a slider 2, and multiple number of balls (rolling elements) 3. The guide rail 1 and the slider 2 are disposed so as to face with each other and have therebetween rolling grooves 11 and 21, respectively, that form a rolling channel for the rolling elements 3. The slider 2 can be divided into a slider main body 201 and end caps 202 attached to both ends of the slider main body in a linear motion direction (the lengthwise direction of the guide rail 1). The rolling grooves 21 are formed in the slider main body 201.

The slider 2 also has return channels 22 for the rolling elements 3 and turn-over channels which cause each return channel 22 and each rolling channel to be communicated with each other. The return channels 22 are formed in the slider main body 201 and the turn-over channels are formed in each end cap 202. Female screws 23 which allow attachment of a table, etc., by means of screws are formed in the top face of the slider 2. Attachment holes 13 for attaching the guide rail 1 to a mounting object like a base by means of bolts are formed in the guide rail 1.

According to this linear guide apparatus, the balls 3 circulate in a circulation channel configured by the rolling channel, the return channel, and the turn-over channel, thereby allowing either one of the guide rail 1 and the slider 2 to take a linear motion with respect to each other.

A set of two side seals 4A and 5A are disposed at each end in the direction in which the slider 2 moves, and the inner seal 4A disposed at the slider side and the outer seal 5A are individually attached by bolts (first screws) 6 and bolts (second screws) 7, respectively.

A female screw 25 for each bolt 7 is formed between the upper and lower return channels 22 of the slider main body 201. A female screw 24 for each bolt 6 is formed above the upper return channel 22 of the slider main body 201. Through-holes 26 for respective bolts 6, through-holes 27 for respective bolts 7, and a female screw 28 for a grease nipple 8 are formed in each end cap 202.

Figure 14:
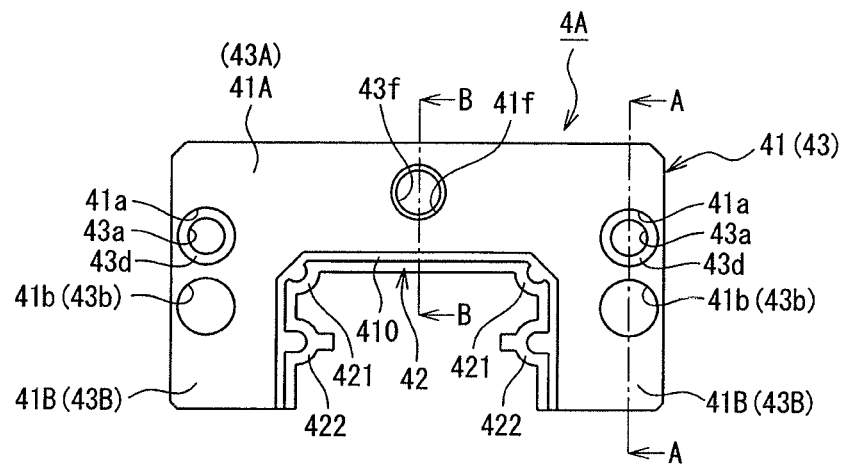
FIG. 14 is a front view showing an inner seal configuring the linear guide apparatus of the second embodiment.

The inner seal 4A will now be explained with reference to FIGS. 14 to 16. FIG. 14 is a front view showing the inner seal 4A (a diagram showing the side where the outer seal 5A is disposed), FIG. 15 is a cross-sectional view taken along a line A-A in FIG. 14, and FIG. 16 is a cross sectional view taken along a line B-B in FIG. 14.

As shown in FIG. 14, the inner seal 4A has a substantially U-shaped front contour that is substantially same as the front contour of the end cap 202, and includes rubber-made tabular member 41 and lip 42, and, a metal plate 43. The metal plate 43 is a metal core for the inner seal 4A, and the tabular member 41 and the lip 42 can be formed by bonding a molten rubber to a surface of the metal plate 43 using a mold.

The tabular member 41 and the metal plate 43 have upper portions 41A and 43A, respectively, to be disposed above the guide rail 1 and respective pairs of side portions 41B and 43B to be disposed at both sides of the guide rail 1. The lip 42 have protrusions 421 and 422 which are in a shape fittable with respective rolling grooves 11 formed in the corners of the guide rail 1 and the side faces thereof. Through-holes (first through-holes) 41a for respective bolts 6 and through-holes (second through-holes) 41b for respective bolts 7 are formed in the side portions 41B of the tabular member 41. The through-holes 41b for respective bolts 7 are disposed below respective through-holes 41a for the bolts 6.

Figure 15:
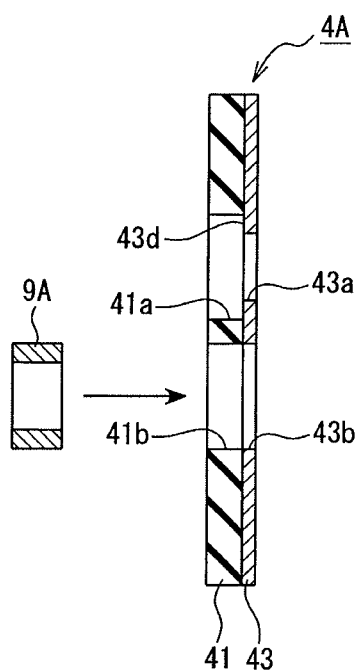
FIG. 15 is a cross-sectional view taken along a line A-A in FIG. 14.
Figure 16:
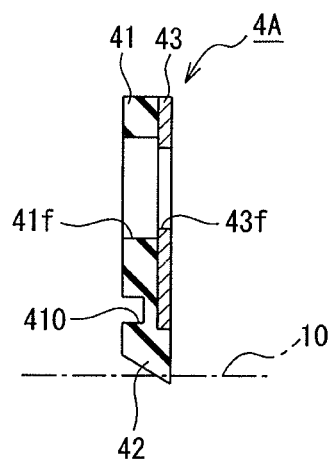
FIG. 16 is a cross-sectional view taken along a line B-B in FIG. 14.

As shown in FIG. 14 and FIG. 15, through-holes (first through-holes) 43a for respective bolts 6 and through-holes (second through-holes) 43b for respective bolts 7 are formed in the metal plate 43 at respective same positions as those of the through-holes 41a and 41b of the tabular member 41. The through-holes 43a of the metal plate 43 are openings which have a diameter that allows respective axes of the bolts 6 and 7 to pass through but does not allow respective heads of the bolts 6 and 7 to pass through. The through-holes 43b of the metal plate 43 and the through-holes 41a and 41b of the tabular member 41 are openings which have a diameter that allows respective heads of the bolts 6 and 7 to pass through.

Accordingly, peripheries 43d of respective through-holes 43a of the metal plate 43 are revealed on the front face of the inner seal 4, and serve as a seat for each bolt 6. Moreover, a metal spacer 9A is disposed in each through-hole 41b of the tabular member 41 and each through-hole 43b of the metal plate 43 which are formed to have the same diameter. The spacer 9A has a dimension in the axial direction which is consistent with the whole thickness of the inner seal 4A, has an external diameter which is consistent with the through-holes 41b and 43b and has an internal diameter which allows the axis of the bolt 7 to pass through but does not allow the head of the bolt 7 to pass through.

As shown in FIG. 14 and FIG. 16, a through-hole 43f for the grease nipple 8 is formed in the center in the widthwise direction and in the upper portion 43A of the metal plate 43. This through-hole 43f has a dimension and a diameter that allow the axis of the grease nipple 8 to pass through but does not allow the head of the grease nipple to pass through. A through-hole 41f for the grease nipple 8 which has a slightly larger diameter than that of the through-hole 43f is also formed in the tabular member 41 at the same position as that of the through-hole 43f.

As shown in FIG. 16, the tabular member 41 has a thickness substantially twice as much as the thickness of the metal plate 43, and a recess 410 is formed in the boundary position with the lip 42. The lip 42 extends (toward a face 10 of the guide rail 1) so as to protrude from a substantially U-shaped opening 431 of the metal plate 43. A tip of the lip 42 is tapered downwardly from the recess-410 side toward the metal-plate-43 side. The inner seal 4A is attached with the metal plate 43 being directed to the slider 2, and thus the lip 42 of the inner seal 4A is an inward lip directed to the slider-2 side.

Figure 17:
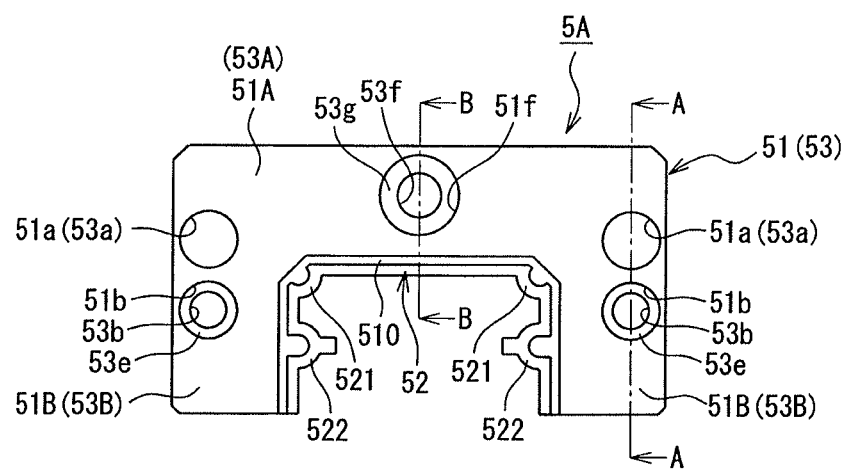
FIG. 17 is a front view showing an outer seal configuring the linear guide apparatus of the second embodiment.

The outer seal 5A will now be explained with reference to FIGS. 17 to 19. FIG. 17 is a front view showing the outer seal 5A, FIG. 18 is a cross-sectional view taken along a line A-A in FIG. 17, and FIG. 19 is a cross-sectional view taken along a line B-B in FIG. 17.

As shown in FIG. 17, the outer seal 5A has a U-shaped front contour that is substantially same as the front contour of the end cap 202, and includes rubber-made tabular member 51 and lip 52, and, a metal plate 53. The metal plate 53 is a metal core for the outer seal 5A, and the tabular member 51 and the lip 52 are formed by bonding a molten rubber to a surface of the metal plate 53 using a mold.

The tabular member 51 and the metal plate 53 have upper portions 51A and 53A, respectively, to be disposed above the guide rail 1, and respective pairs of side portions 51B and 53B to be disposed at both sides of the guide rail 1. The lip 52 has protrusions 521 and 522 formed in a shape fittable with respective rolling grooves 11 in the corners of the guide rail 1 and the side faces thereof. Through-holes (third through-holes) 51a for respective bolts 6 are formed in the side portions 51B of the tabular member 51 at respective same positions as those of the through-holes 43a of the inner seal 4A.

Figure 18:
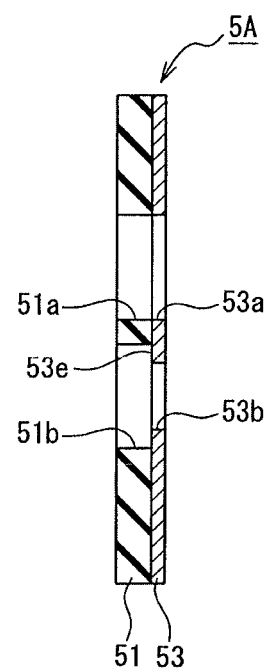
FIG. 18 is a cross-sectional view taken along a line A-A in FIG. 17.
Figure 19:
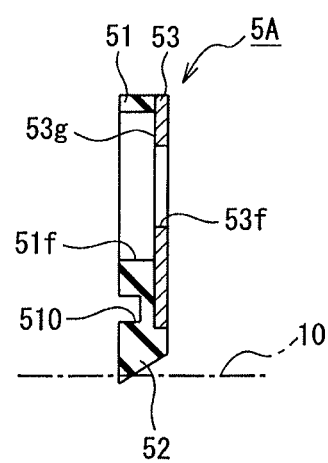
FIG. 19 is a cross-sectional view taken along a line B-B in FIG. 17.

As shown in FIG. 17 and FIG. 18, through-holes (third through-holes) 53a for respective bolts 6 are formed in the metal plate 53 at respective same positions as those of the through-holes 51a of the tabular member 51. The through-holes 53a of the metal plate 53 and through-holes 51a of the tabular member 51 are each an opening which has a diameter that allows the head of the bolt 6 to pass through.

Through-holes (forth through-holes) 51b for bolts 7 are also formed in the side portions 51B of the tabular member 51 at respective same positions as those of the through-holes 43b of the inner seal 4A. Through-holes (forth through-holes) 53b for respective bolts 7 are also formed in the metal plate 53 at respective same positions as those of the through-holes 51b of the tabular member 51. The through-holes 53b of the metal plate 53 are each an opening which has a diameter that allows the axis of the bolt 7 to pass through but does not allow the head of the bolt 7 to pass through. The through-holes 51b of the tabular member 51 are each an opening which has a diameter that allows the head of the bolt 7 to pass through. Accordingly, peripheries 53e of the through-holes 53b of the metal plate 53 are revealed on the front face of the outer seal 5A and serve as a seat for each bolt 7.

As shown in FIG. 17 and FIG. 19, a through-hole 53f for the grease nipple 8 is formed in the center of the upper portion 53A of the metal plate 53 in the widthwise direction. A through-hole 51f for the grease nipple 8 is also formed in the tabular member 51 at the same position as that of the through-hole 53f. The through-hole 53f of the metal plate 53 is an opening which has a diameter that allows the axis of the grease nipple 8 to pass through but does not allow the head of the grease nipple to pass through. The through-hole 51f of the tabular member 51 is an opening which has a diameter that allows the head of the grease nipple 8 to pass through. Accordingly, the through-hole 53f of the metal plate 53 has a periphery 53g revealed on the front face of the outer seal 5A and serving as a seat for the grease nipple 8.

As shown in FIG. 19, the tabular member 51 has a thickness substantially twice as much as the thickness of the metal plate 53, and a recess 510 is formed in the boundary position with the lip 52. The lip 52 extends (toward the face 10 of the guide rail 1) so as to protrude from a substantially U-shaped opening 531 of the metal plate 53. A tip of the lip 52 is tapered upwardly from the recess-510 side toward the metal-plate-53 side. The outer seal 5A is attached with the metal plate 53 being directed to the slider 2, and thus the lip 52 of the outer seal 5A is an outward lip directed opposite to the slider 2.

Figure 20:
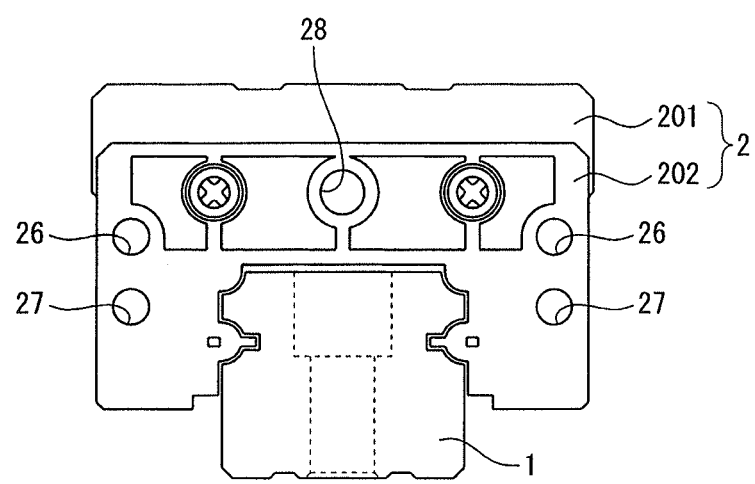
FIG. 20 is a front view showing the linear guide apparatus before the inner seal and the outer seal are attached thereto.

The inner seals 4A and the outer seals 5A are attached to both ends of the slider 2 through the following method after the guide rail 1 is assembled with the slider 2 (the slider main body 201 and the end caps 202) and the balls 3 to let the linear guide apparatus to be in the condition shown in FIG. 20 (front view).

Figure 21:
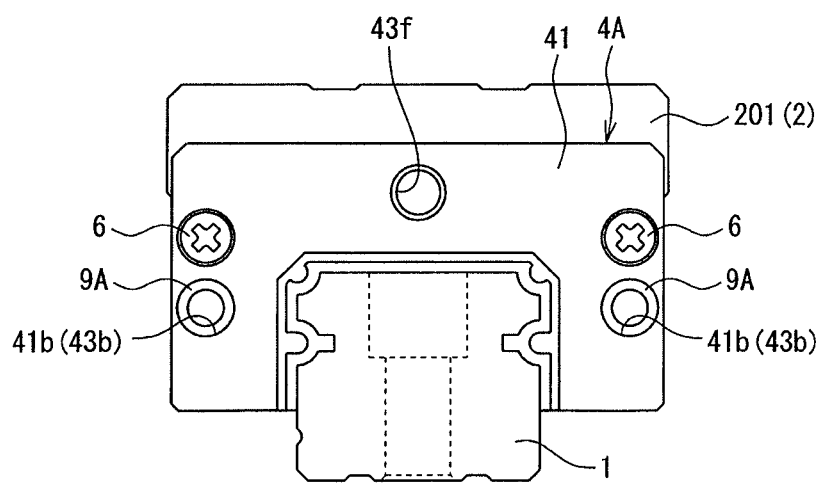
FIG. 21 is a front view showing the linear guide apparatus with the inner seal being attached thereto and a spacer being disposed according to the second embodiment.

First, the inner seals 4A are disposed outwardly of respective end caps 202 of the slider 2 with each metal plate 43 being directed to the end cap 202. Next, the axes of the bolts 6 are caused to pass through respective through-holes 41a of the tabular member 41 of the inner seal 4A, respective through-holes 43a of the metal plate 43, and respective through-holes 26 of the end cap 202, and the male screws at respective tips of the bolts 6 are engaged with the female screws 24 of the slider main body 201. Next, the metal spacers 9A are fitted in from respective through-holes 41b of the tabular member 41 of the inner seal 4A, and disposed in respective these through-holes 41b and respective through-holes 43b of the metal plate 43. FIG. 21 shows this condition.

Next, the outer seals 5A are disposed outwardly of respective inner seals 4A with each metal plate 53 being directed to the inner seal 4A. Subsequently, the axes of the bolts 7 are caused to pass through respective through-holes 51b of the tabular member 51 of the outer seal 5A, respective through-holes 53b of the metal plate 53, respective spacers 9A disposed in respective through-holes 41b and 43b of the inner seal 4A, and respective through-holes 27 of the end cap 202. The male screws at respective tips of the bolts 7 are engaged with respective female screws 25 of the slider main body 201.

Figure 22:
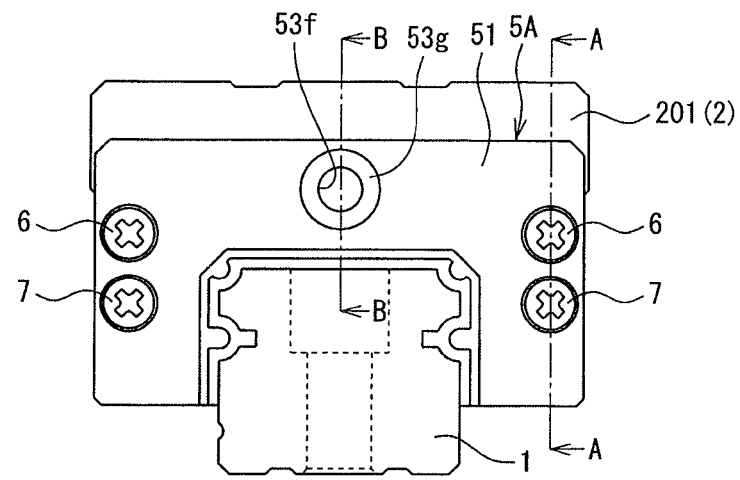
FIG. 22 is a front view showing the linear guide apparatus with the outer seal being attached thereto according to the second embodiment.
Figure 23:
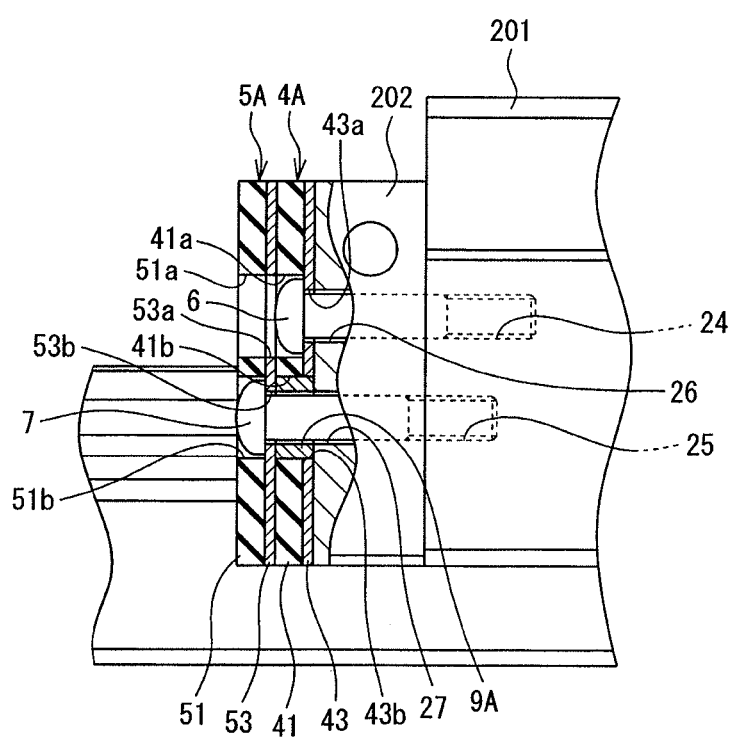
FIG. 23 is a side view showing an end of a slider of the linear guide apparatus of the second embodiment with the outer seal being attached and showing a cross section taken along a line A-A in FIG. 22 with several portions being indicated by dashed lines.
Figure 24:
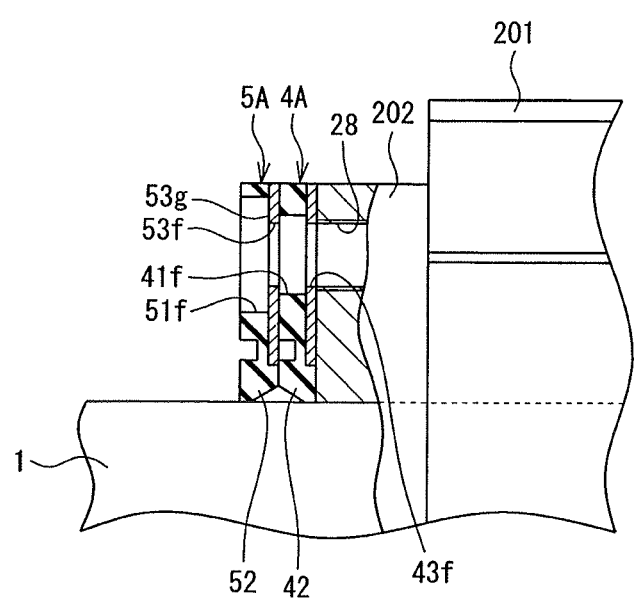
FIG. 24 is a diagram showing a cross section of the end of the slider of the linear guide apparatus taken along a line B-B in FIG. 22 with the outer seal being attached according to the second embodiment.

FIG. 22 is a front view showing the linear guide apparatus in this condition. FIG. 23 is a side view showing the end of the slider of the linear guide apparatus in this condition and showing a cross section taken along a line A-A in FIG. 22. with several portions being indicated by dashed lines. FIG. 24 is a diagram showing a cross section of the end of a slider of the linear guide apparatus in this condition taken along a line B-B in FIG. 22.

With respect to the linear guide apparatus in this condition, the axis of the grease nipple 8 is caused to pass through the through-hole 53f of the outer seal 5A and the through-hole 43f of the inner seal 4A. The male screw at the tip of the grease nipple is engaged with the female screw 28 of the end cap 202, and the head of the grease nipple 8 is fitted in the through-hole 51f of the outer seal 5A to place the head of the grease nipple at the periphery 53g of the through-hole 53b (see FIG. 24). Accordingly, the assembling of the linear guide apparatus is completed.

According to the linear guide apparatus of this embodiment, the inner seal 4A and the outer seal 5A are individually attached to the slider main body 201 by bolts (screws) 6 and 7, and thus the two side seals disposed in an overlapped manner can be attached easily and highly precisely. Moreover, the one lip is not affected by another lip unlike the integral double-lip structure when the slider 2 is actuated, and thus a space is not likely to be formed between the adjoining lips 42 and 52 and the guide rail 1.

Moreover, as shown in FIG. 24, the outer seal 5A that is disposed outwardly of the direction in which the slider 2 moves has the lip 52 directed outwardly, and the inner seal 4A that is disposed inwardly of the direction in which the slider 2 moves has the lip 42 directed inwardly. Hence, both dust-proof performance and hermetical sealing performance can be accomplished by the two side seals 4A and 5A. Accordingly, the linear guide apparatus of this embodiment has both superior dust-proof performance and hermetical sealing performance in comparison with the linear guide apparatus which has the side seal with the integral double-lip structure.

Furthermore, according to the linear guide apparatus in this condition, as shown in FIG. 23, a driver can be inserted through the through-holes 51a and 53a having the same diameter as that of the through-hole 41a of the inner seal 4A to turn the bolt 6 with the two side seals 4A and 5A being attached to the linear guide apparatus by the bolts 6 and 7. Still further, the metal spacer 9A has an end face contacting the end face of the end cap 202, and has another end face contacting the periphery 53e of the through-hole 53b of the outer seal 5A, and, the bolt 7 is fitted in the spacer 9A with the axis of the such having play. Accordingly, no tightening force by the bolt 7 affects the inner seal 4A. Therefore, the attaching position of the inner seal 4A can be adjusted without changing the attachment condition of the outer seal 5A after the outer seal 5A is attached by the bolts 7.

[Third Embodiment]

Figure 25:
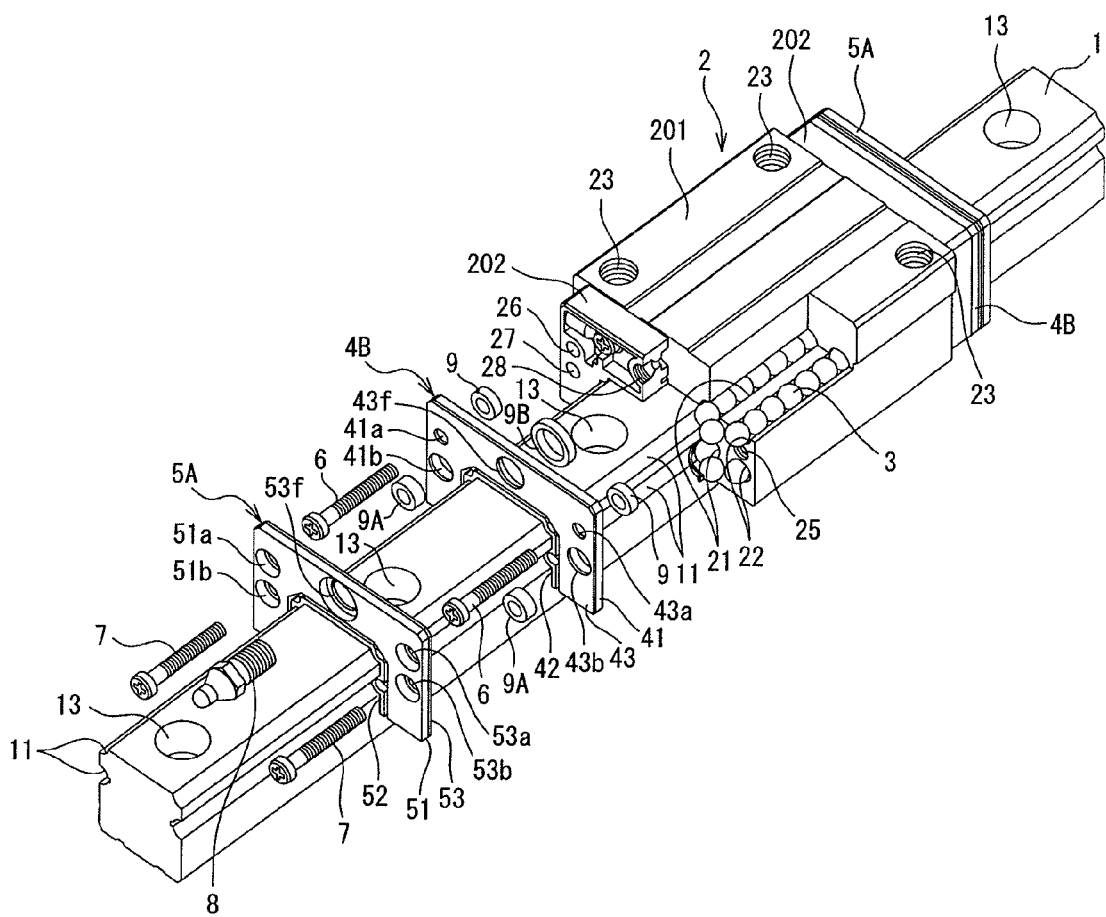
FIG. 25 is a perspective view showing a linear guide apparatus according to a third embodiment.

A linear guide apparatus of this embodiment includes, as shown in FIG. 25, a guide rail 1, a slider 2, and multiple number of balls (rolling elements) 3. The guide rail 1 and the slider 2 are disposed so as to face with each other and have therebetween rolling grooves 11 and 21, respectively, that form a rolling channel for the rolling elements 3. The slider 2 can be divided into a slider main body 201 and end caps 202 attached to both ends of the slider main body in a linear motion direction (the lengthwise direction of the guide rail 1). The rolling grooves 21 are formed in the slider main body 201.

The slider 2 also has return channels 22 for the rolling elements 3 and turn-over channels which cause each return channel 22 and each rolling channel to be communicated with each other. The return channels 22 are formed in the slider main body 201 and the turn-over channels are formed in each end cap 202. Female screws 23 which allow attachment of a table, etc., by means of screws are formed in the top face of the slider 2. Attachment holes 13 for attaching the guide rail 1 to a mounting object like a base by means of bolts are formed in the guide rail 1.

According to this linear guide apparatus, the balls 3 circulate in a circulation channel configured by the rolling channel, the return channel, and the turn-over channel, thereby allowing either one of the guide rail 1 and the slider 2 to take a linear motion with respect to each other.

A set of two side seals 4B and 5A are disposed at each end in the direction in which the slider 2 moves, and the inner seal 4B disposed at the slider side and the outer seal 5A are individually attached by bolts (first screws) 6 and bolts (second screws) 7, respectively.

A female screw 25 for each bolt 7 is formed between the upper and lower return channels 22 of the slider main body 201. A female screw 24 for each bolt 6 is formed above the upper return channel 22 of the slider main body 201. Through-holes 26 for respective bolts 6, through-holes 27 for respective bolts 7, and a female screw 28 for a grease nipple 8 are formed in each end cap 202.

Figure 26:
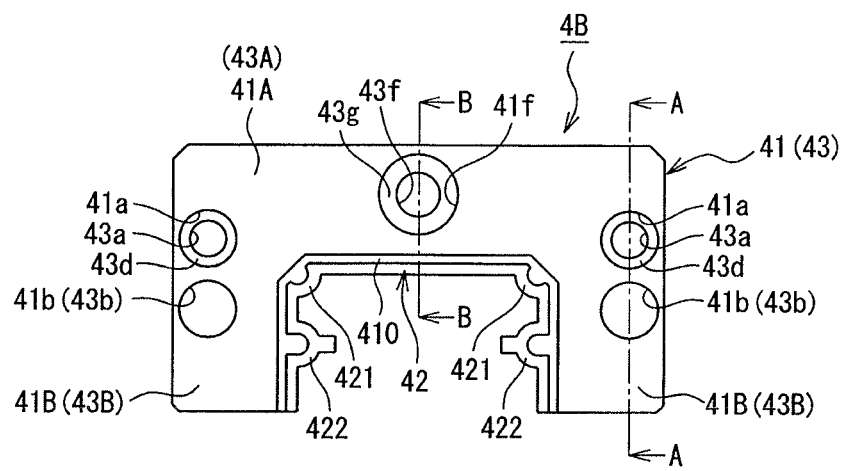
FIG. 26 is a front view showing an inner seal configuring the linear guide apparatus of the third embodiment.

The inner seal 4B will now be explained with reference to FIGS. 26 to 28. FIG. 26 is a front view showing the inner seal 4B (a diagram showing the side where the outer seal 5A is disposed), FIG. 27 is a cross-sectional view taken along a line A-A in FIG. 26, and FIG. 28 is a cross-sectional view taken along a line B-B in FIG. 26.

As shown in FIG. 26, the inner seal 4B has a substantially U-shaped front contour that is substantially same as the front contour of the end cap 202, and includes rubber-made tabular member 41 and lip 42, and, a metal plate 43. The metal plate 43 is a metal core for the inner seal 4B, and the tabular member 41 and the lip 42 can be formed by bonding a molten rubber to a surface of the metal plate 43 using a mold.

The tabular member 41 and the metal plate 43 have upper portions 41A and 43A, respectively, to be disposed above the guide rail 1 and respective pairs of side portions 41B and 43B to be disposed at both sides of the guide rail 1. The lip 42 has protrusions 421 and 422 which are in a shape fittable with respective rolling grooves 11 formed in the corners of the guide rail 1 and the side faces thereof. Through-holes (first through-holes) 41a for respective bolts 6 and through-holes (second through-holes) 41b for respective bolts 7 are formed in the side portions 41B of the tabular member 41. The through-holes 41b for respective bolts 7 are disposed below respective through-holes 41a for the bolts 6.

Figure 27:
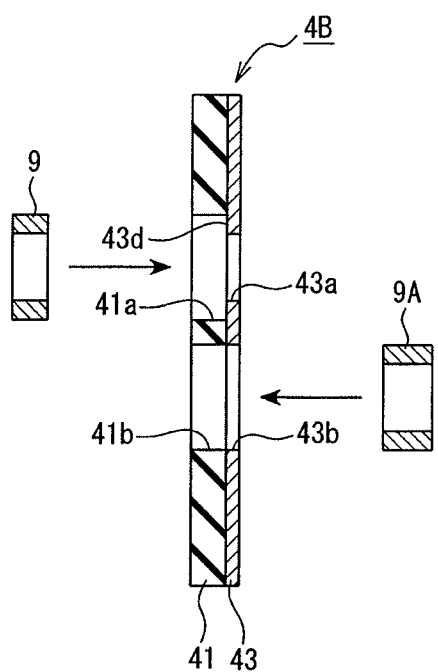
FIG. 27 is a cross-sectional view taken along a line A-A in FIG. 26.
Figure 28:
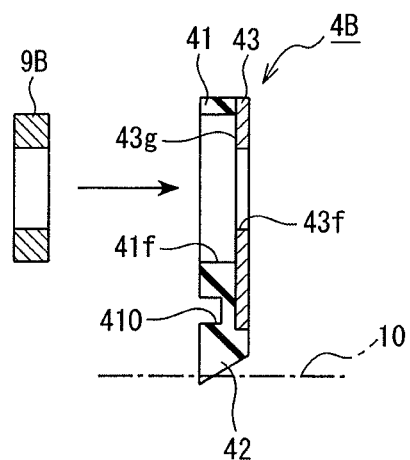
FIG. 28 is a cross-sectional view taken along a line B-B in FIG. 26.

As shown in FIG. 26 and FIG. 27, through-holes (first through-holes) 43a for respective bolts 6 and through-holes (second through-holes) 43b for respective bolts 7 are formed in the metal plate 43 at respective same positions as those of the through-holes 41a and 41b of the tabular member 41. The through-holes 43a of the metal plate 43 are openings which have a diameter that allows respective axes of the bolts 6 and 7 to pass through but does not allow respective heads of the bolts 6 and 7 to pass through. The through-holes 43b of the metal plate 43 and the through-holes 41a and 41b of the tabular member 41 are openings which have a diameter that allows respective heads of the bolts 6 and 7 to pass through. Accordingly, peripheries 43d of respective through-holes 43a of the metal plate 43 are revealed.

As shown in FIG. 27, a metal spacer 9 is disposed in each through-hole 41a of the tabular member 41, and has the end face contacting the periphery 43d of the through-hole 43a. The spacer 9 has a dimension in the axial direction which is consistent with the thickness of the tabular member 41, has an external diameter which is consistent with the internal diameter of the through-hole 41a of the tabular member 41, and has an internal diameter which is consistent with the internal diameter of the through-hole 43a of the metal plate 43. Moreover, a metal spacer 9A is disposed in each through-hole 41b of the tabular member 41 and each through-hole 43b of the metal plate 43 which are formed to have the same diameter. The spacer 9A has a dimension in the axial direction which is consistent with the whole thickness of the inner seal 4B, has an external diameter which is consistent with the through-holes 41b and 43b, and has an internal diameter which allows the axis of the bolt 7 to pass through but does not allow the head of the bolt 7 to pass through.

As shown in FIG. 26 and FIG. 28, a through-hole 43f for the grease nipple 8 is formed in the center in the widthwise direction and in the upper portion 43A of the metal plate 43. This through-hole 43f has a dimension and a diameter that allow the axis of the grease nipple 8 to pass through but does not allow the head of the grease nipple to pass through. A through-hole 41f for the grease nipple 8 is also formed in the tabular member 41 at the same position as that of the through-hole 43f. The through-hole 41f of the tabular member 41 has a dimension and a diameter that allow the head of the grease nipple 8 to pass through. Accordingly, a periphery 43g of the through-hole 43f of the metal plate 43 is revealed.

As shown in FIG. 28, the tabular member 41 has a thickness substantially twice as much as the thickness of the metal plate 43, and a recess 410 is formed in the boundary position with the lip 42. The lip 42 extends (toward a face 10 of the guide rail 1) so as to protrude from a substantially U-shaped opening 431 of the metal plate 43. A tip of the lip 42 is tapered upwardly from the recess-410 side toward the metal-plate-43 side. The inner seal 4B is attached with the tabular member 41 being directed to the slider 2, and thus the lip 42 of the inner seal 4B is an inward lip directed to the slider-2 side.

Figure 29:
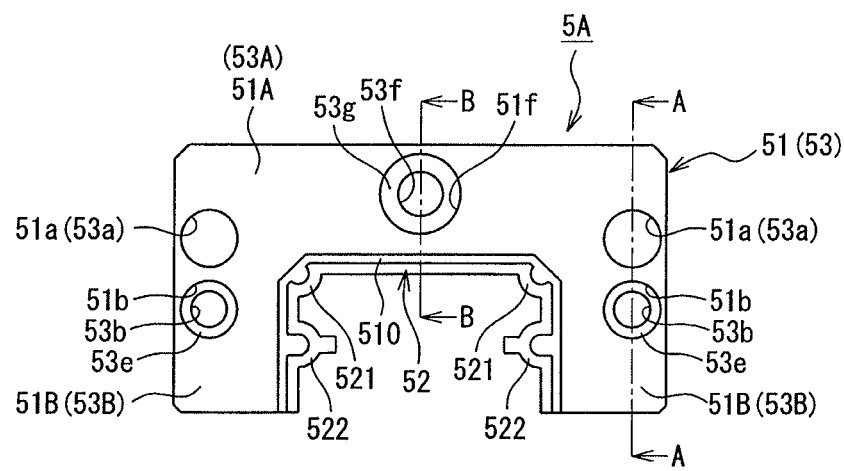
FIG. 29 is a front view showing an outer seal configuring the linear guide apparatus of the third embodiment.

The outer seal 5A will now be explained with reference to FIGS. 29 to 31. FIG. 29 is a front view showing the outer seal 5A, FIG. 30 is a cross-sectional view taken along a line A-A in FIG. 29, and FIG. 31 is a cross-sectional view taken along a line B-B in FIG. 29.

As shown in FIG. 29, the outer seal 5a has a U-shaped front contour that is substantially same as the front contour of the end cap 202, and includes rubber-made tabular member 51 and lip 52, and, a metal plate 53. The metal plate 53 is a metal core for the outer seal 5A, and the tabular member 51 and the lip 52 are formed by bonding a molten rubber to a surface of the metal plate 53 using a mold.

The tabular member 51 and the metal plate 53 have upper portions 51A and 53A, respectively, to be disposed above the guide rail 1, and respective pairs of side portions 51B and 53B to be disposed at both sides of the guide rail 1. The lip 52 has protrusions 521 and 522 formed in a shape fittable with respective rolling grooves 11 in the corners of the guide rail 1 and the side faces thereof. Through-holes (third through-holes) 51a for respective bolts 6 are formed in the side portions 51B of the tabular member 51 at respective same positions as those of the through-holes 43a of the inner seal 4B.

Figure 30:
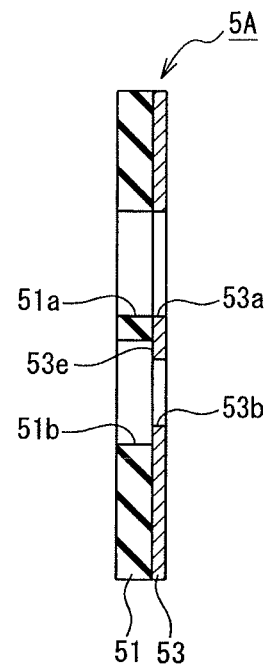
FIG. 30 is a cross-sectional view taken along a line A-A in FIG. 29.
Figure 31:
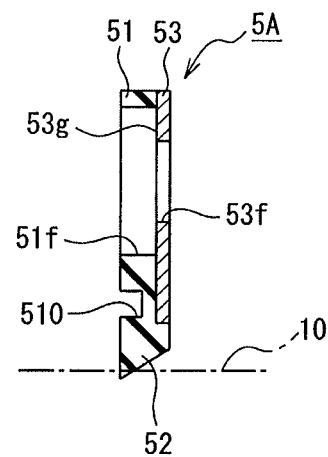
FIG. 31 is a cross-sectional view taken along a line B-B in FIG. 29.

As shown in FIG. 29 and FIG. 30, through-holes (third through-holes) 53a for respective bolts 6 are formed in the metal plate 53 at respective same positions as those of the through-holes 51a of the tabular member 51. The through-holes 53a of the metal plate 53 and through-holes 51a of the tabular member 51 are each an opening which has a diameter that allows the head of the bolt 6 to pass through.

Through-holes (forth through-holes) 51b for respective bolts 7 are also formed in the side portions 51B of the tabular member 51 at respective same positions as those of the through-holes 43b of the inner seal 4B. Through-holes (forth through-holes) 53b for respective bolts 7 are also formed in the metal plate 53 at respective same positions as those of the through-holes 51*b* of the tabular member 51. The through-holes 53*b* of the metal plate 53 are each an opening which has a diameter that allows the axis of the bolt 7 to pass through but does not allow the head of the bolt 7 to pass through. The through-holes 51*b* of the tabular member 51 are each an opening which has a diameter that allows the head of the bolt 7 to pass through. Accordingly, peripheries 53*e* of the through-holes 53*b* of the metal plate 53 are revealed on the front face of the outer seal 5A and serve as a seat for each bolt 7.

As shown in FIG. 29 and FIG. 31, a through-hole 53*f* for the grease nipple 8 is formed in the center of the upper portion 53A of the metal plate 53 in the widthwise direction. A through-hole 51*f* for the grease nipple 8 is also formed in the tabular member 51 at the same position as that of the through-hole 53*f*. The through-hole 53*f* of the metal plate 53 is an opening which has a diameter that allows the axis of the grease nipple 8 to pass through but does not allow the head of the grease nipple to pass through. The through-hole 51*f* of the tabular member 51 is an opening which has a diameter that allows the head of the grease nipple 8 to pass through. Accordingly, the through-hole 53*f* of the metal plate 53 has a periphery 53*g* revealed on the front face of the outer seal 5A and serving as a seat for the grease nipple 8.

As shown in FIG. 31, the tabular member 51 has a thickness substantially twice as much as the thickness of the metal plate 53, and a recess 510 is formed in the boundary position with the lip 52. The lip 52 extends (toward the face 10 of the guide rail 1) so as to protrude from a substantially U-shaped opening 531 of the metal plate 53. A tip of the lip 52 is tapered upwardly from the recess-510 side toward the metal-plate-53 side. The outer seal 5A is attached with the metal plate 53 being directed to the slider 2, and thus the lip 52 of the outer seal 5A is an outward lip directed opposite to the slider 2.

Figure 32:
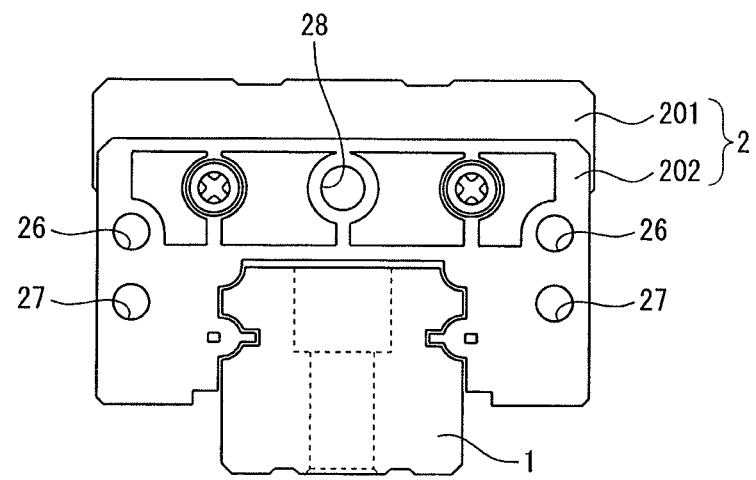
FIG. 32 is a front view showing the linear guide apparatus before the inner seal and the outer seal are attached thereto.

The inner seals 4B and the outer seals 5A are attached to both ends of the slider 2 through the following method after the guide rail 1 is assembled with the slider 2 (the slider main body 201 and the end caps 202) and the balls 3 to let the linear guide apparatus to be in the condition shown in FIG. 32 (front view).

Figure 33:
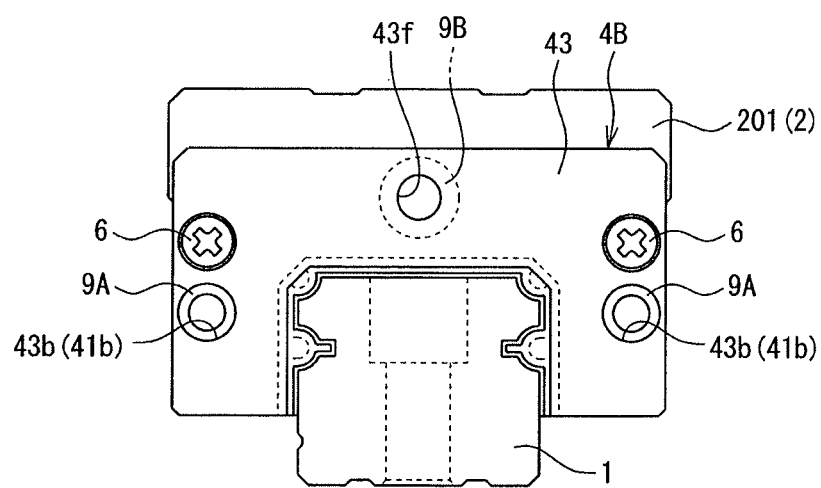
FIG. 33 is a front view showing the linear guide apparatus with the inner seal being attached thereto and a spacer being disposed according to the third embodiment.

First, with the spacers 9 and 9B being fitted in respective through-holes 41*a* and 41*f* of the tabular member 41, the inner seals 4B are disposed outwardly of respective end caps 202 of the slider 2 with each tabular member 41 being directed to the end cap 202. Next, the axes of the bolts 6 are caused to pass through respective through-holes 43*a* of the metal plate 43, respective through-holes 41*a* of the tabular member 41 of the inner seal 4B, and respective through-holes 26 of the end cap 202, and the male screws at respective tips of the bolts 6 are engaged with the female screws 24 of the slider main body 201. Next, the metal spacers 9A are fitted in from respective through-holes 43*b* of the metal plate 43 of the inner seal 4B, and disposed in respective these through-holes 43*b* and respective through-holes 41*b* of the tabular member 41. FIG. 33 shows this condition.

Next, the outer seals 5A are disposed outwardly of respective inner seals 4B with each metal plate 53 being directed to the inner seal 4B. Subsequently, the axes of the bolts 7 are caused to pass through respective through-holes 51*b* of the tabular member 51 of the outer seal 5A, respective through-holes 53*b* of the metal plate 53, respective spacers 9A disposed in respective through-holes 41*b* and 43*b* of the inner seal 4B, and respective through-holes 27 of the end cap 202. The male screws at respective tips of the bolts 7 are engaged with respective female screws 25 of the slider main body 201.

Figure 34:
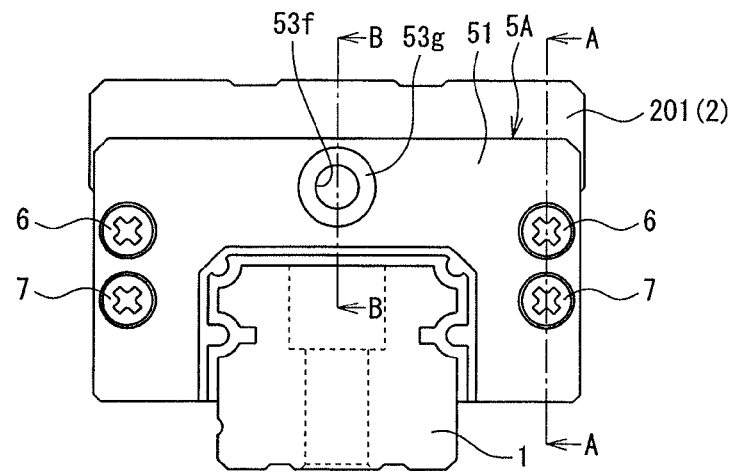
FIG. 34 is a front view showing the linear guide apparatus with the outer seal being attached thereto according to the third embodiment.
Figure 35:
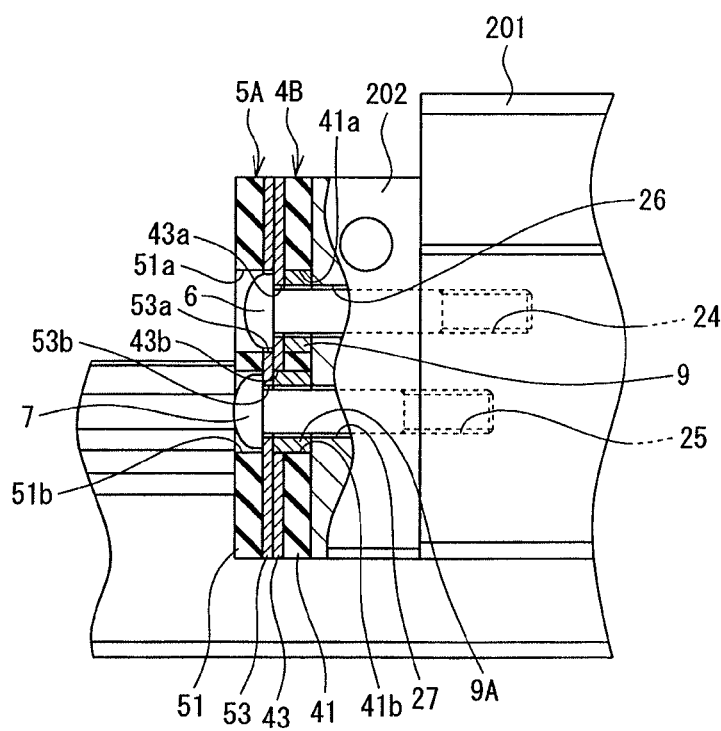
FIG. 35 is a side view showing an end of a slider of the linear guide apparatus of the third embodiment and showing a cross section taken along a line A-A in FIG. 34 with several portions being indicated by dashed lines.
Figure 36:
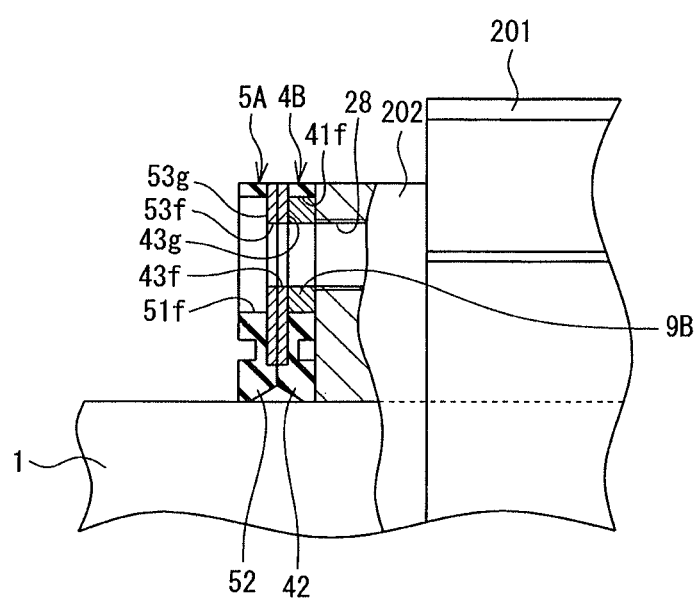
FIG. 36 is a diagram showing a cross section of the end of the slider of the linear guide apparatus taken along a line B-B in FIG. 34 according to the third embodiment.

FIG. 34 is a front view showing the linear guide apparatus in this condition. FIG. 35 is a side view showing the end of the slider of the linear guide apparatus in this condition and showing a cross section taken along a line A-A in FIG. 34. with several portions being indicated by dashed lines. FIG. 36 is a diagram showing a cross section of the end of a slider of the linear guide apparatus in this condition taken along a line B-B in FIG. 34.

With respect to the linear guide apparatus in this condition, the axis of the grease nipple 8 is caused to pass through the through-hole 53*f* of the outer seal 5A, the through-hole 43*f* of the metal plate 43 of the inner seal 4B, and the spacer 9B disposed in the through-hole 41*f* of the tabular member 41. The male screw at the tip of the grease nipple is engaged with the female screw 28 of the end cap 202, and the head of the grease nipple 8 is fitted in the through-hole 51*f* of the outer seal 5A to place the head of the grease nipple at the periphery 53*g* of the through-hole 53*f* (see FIG. 36). Accordingly, the assembling of the linear guide apparatus is completed.

According to the linear guide apparatus of this embodiment, the inner seal 4B and the outer seal 5A are individually attached to the slider main body 201 by bolts (screws) 6 and 7, and thus the two side seals disposed in an overlapped manner can be attached easily and highly precisely. Moreover, the one lip is not affected by another lip unlike the integral double-lip structure when the slider 2 is actuated, and thus a space is not likely to be formed between the adjoining lips 42 and 52 and the guide rail 1.

Moreover, as shown in FIG. 36, the outer seal 5A that is disposed outwardly of the direction in which the slider 2 moves has the lip 52 directed outwardly, and the inner seal 4B that is disposed inwardly of the direction in which the slider 2 moves has the lip 42 directed inwardly. Hence, both dust-proof performance and hermetical sealing performance can be accomplished by the two side seals 4B and 5A. Accordingly, the linear guide apparatus of this embodiment has both superior dust-proof performance and hermetical sealing performance in comparison with the linear guide apparatus which has the side seal with the integral double-lip structure.

Furthermore, according to the linear guide apparatus in this condition, as shown in FIG. 35, a driver can be inserted through the through-holes 51*a* and 53*a* to turn the bolt 6 with the two side seals 4B and 5A being attached to the linear guide apparatus by the bolts 6 and 7. Still further, the metal spacer 9A has an end face contacting the end face of the end cap 202, and has another end face contacting the periphery 53*e* of the through-hole 53*b* of the outer seal 5A, and, the bolt 7 is fitted in the spacer 9A with the axis of such a bolt having play. Accordingly, no tightening force by the bolt 7 affects the inner seal 4B. Therefore, the attaching position of the inner seal 4B can be adjusted without changing the attachment condition of the outer seal 5A after the outer seal 5A is attached by the bolts 7.

Moreover, the metal spacer 9 is disposed in the through-hole 41*a* of the rubber-made tabular member 41 of the inner seal 4B, has an end face contacting the periphery 43*d* of the through-hole 41*a*, and has another end face contacting the end face of the end cap 202. In addition, the axis of the bolt 6 is fitted in the spacer 9 with play. Accordingly, it becomes possible to prevent the rubber-made tabular member 41 from being elastically deformed in the thickness direction thereof when the inner seal 4B is attached by the bolts 6. Therefore, appropriate attachment of the inner seal 4B by the bolts 6 is enabled.

Furthermore, the inner seal 4B and the outer seal 5 A have the tabular members 41 and 51, and the lips 42 and 52 which are exactly in the same shape, and have a difference only in the diameter of the corresponding through-holes (43*a* and 53*a*, and, 43*b* and 53*b*) of the metal plates 43 and 53. Therefore, by using the metal plates 43 and 53 as respective metal cores, when producing the inner seal 4B and the outer seal 5A by bonding a molten rubber to respective one-side surfaces of the metal plates 43 and 53 using a mold, there is an advantage that the same mold can be used.

Reference Signs List
- 1 Guide rail
- 11 Rolling groove of guide rail
- 13 Attachment hole
- 2 Slider
- 21 Rolling groove of slider
- 22 Return channel
- 23 Female screw
- 24 Female screw
- 25 Female screw
- 26 Through-hole
- 27 Through-hole
- 201 Slider main body
- 202 End cap
- 3 Ball (Rolling element)
- 4 Inner seal (Side seal)
- 4A Inner seal (Side seal)
- 4B Inner seal (Side seal)
- 41 Tabular member of inner seal
- 41A Upper portion of tabular member
- 41B Side portion of tabular member
- 41*a* Through-hole
- 41*b* Through-hole
- 41*f* Through-hole
- 410 Recess
- 42 Lip
- 421, 422 Protrusion
- 43 Metal plate of inner seal
- 43A Upper portion of metal plate
- 43B Side portion of metal plate
- 43*a* Through-hole
- 43*b* Through-hole
- 43*d* Periphery of through-hole
- 43*e* Periphery of through-hole
- 43*f* Through-hole
- 43*g* Periphery of through-hole
- 5 Outer seal (Side seal)
- 5A Outer seal (Side seal)
- 51 Tabular member of outer seal
- 51A Upper portion of tabular member
- 51B Side portion of tabular member
- 51*a* Through-hole
- 51*f* Through-hole
- 510 Recess
- 52 Lip
- 521, 522 Protrusion
- 53 Metal plate of outer seal
- 53A Upper portion of metal plate
- 53B Side portion of metal plate
- 53*a* Through-hole
- 53*b* Through-hole
- 53*e* Periphery of through-hole
- 53*f* Through-hole
- 53*g* Periphery of through-hole
- 6 Bolt (First screw)
- 7 Bolt (Second screw)
- 8 Grease nipple
- 9 Spacer
- 9A Spacer
- 9B Spacer

The invention claimed is:

1. A linear guide apparatus comprising:
   a guide rail;
   a slider; and
   a plurality of rolling elements,
   the guide rail and the slider being disposed so as to face with each other and including therebetween a rolling surface which forms a rolling channel for the rolling elements,
   the rolling elements being configured to roll over the rolling channel to allow either one of the guide rail and the slider to take a linear motion with respect to each other,
   a plurality of side seals, each of which contacts the guide rail in a sliding manner, being disposed at each of both ends in a direction in which the slider moves, wherein:
   the plurality of side seals each comprise a metal plate, and a tabular member and a lip both formed of an elastic material, the metal plate, the tabular member, and the lip being integral with each other,
   an inner seal among the plurality of side seals is individually attached to the slider by a first screw engaging with the slider, the inner seal being disposed at an innermost side of the direction in which the slider moves,
   an outer seal among the plurality of side seals is individually attached to the slider by a second screw other than the first screw, the second screw engaging with the slider, the outer seal being disposed at an outermost side of the direction in which the slider moves,
   a first through-hole that allows an axis of the first screw to pass through, and a second through-hole that allows an axis of the second screw to pass through are formed in the metal plate of the inner seal and the tabular member thereof,
   the outer seal comprises a third through-hole that allows a head of the first screw to be revealed, and a fourth through-hole that is communicated with the second through-hole of the inner seal, and
   a spacer is disposed in the second through-hole of the metal plate of the inner seal and the tabular member thereof, an end face of the spacer contacts an end face of the slider, another end face of the spacer contacts a periphery of the fourth through-hole of the metal plate of the outer seal, and the axis of the second screw is fitted in the spacer with play.

2. The linear guide apparatus according to claim 1, wherein the outer seal comprises an outward lip, and the inner seal comprises an inward lip.

3. The linear guide apparatus according to claim 1, wherein a metal spacer is disposed in the first through-hole of the tabular member of the inner seal.

4. The linear guide apparatus according to claim 1, wherein, the second through-hole is disposed below the first through-hole, and a thickness of the inner seal is consistent with a thickness of the spacer.

\* \* \* \* \*